United States Patent [19]

Mullally

[11] Patent Number: 5,066,063
[45] Date of Patent: Nov. 19, 1991

[54] REMOVABLE COVER FOR A TRUCK CARGO BOX

[76] Inventor: Regis K. Mullally, 4973 SE. Grouper Ave., Stuart, Fla. 34997

[21] Appl. No.: 583,591

[22] Filed: Sep. 17, 1990

[51] Int. Cl.$^5$ ............................................. B60P 7/04
[52] U.S. Cl. .................................. 296/100; 296/108; 296/118; 296/121
[58] Field of Search ............... 296/100, 107, 108, 110, 296/118, 121

[56] References Cited

U.S. PATENT DOCUMENTS

| | | | |
|---|---|---|---|
| 3,773,379 | 11/1973 | Loiseau | 296/100 X |
| 4,310,194 | 1/1982 | Biller | 296/100 X |
| 4,709,956 | 12/1987 | Bowman | 296/100 |
| 4,738,274 | 4/1988 | Heath | 296/100 X |
| 4,739,528 | 4/1988 | Allen | 296/100 X |
| 4,789,196 | 12/1988 | Fields | 296/100 |
| 4,813,734 | 3/1989 | Hoover | 296/100 |
| 4,850,634 | 7/1989 | Tauritz | 296/121 X |

FOREIGN PATENT DOCUMENTS 203375 10/1958 Austria .............................. 296/100

*Primary Examiner*—Margaret A. Focarino
*Assistant Examiner*—Andrew C. Pike
*Attorney, Agent, or Firm*—Eckert Seamans Cherin & Mellott

[57] ABSTRACT

A removable cover for a truck cargo box preferably includes a cover sheet providing suction cups for attaching to a truck cab roof and extending rearwardly over a cargo box and support frame to connect with adjustable straps for bringing the cover sheet into taut condition wherein the support frame comprises a collapsible structure for attachment through extension posts and post brackets to sidewalls of the cargo box and wherein all components of the removable cover can be folded for storage in a portable bag.

13 Claims, 7 Drawing Sheets

REMOVABLE COVER FOR A TRUCK CARGO BOX

BACKGROUND OF THE INVENTION

1. Field of the Invention

This invention relates generally to truck cargo box covers, and more particularly to removable truck cargo box covers.

2. Prior Art

Pick up trucks having open cargo boxes provide many advantages over similar vehicles having enclosed storage areas, such as vans. In open box pickup trucks, height restrictions do not limit the transport of large objects. Additionally, the open cargo box allows convenient side and back access to the contents of the box. The cargo box can also be a convenient location from which to view outdoor sporting events such as auto races.

One disadvantage of the open cargo box design, however, is exposure of the cargo box contents to weather elements such as sun, rain, and snow. Several covers have been developed to cover open cargo boxes. Portions of these covers are usually designed to permanently attach to the truck or cargo box. These covers are difficult to install, and detract from the convenience of the open box design.

Other cover devices are designed to maintain the advantages of the open cargo box by providing a removable cover for temporarily protecting against weather elements while allowing removal when an open cargo box is desired. However, these covers are often difficult to assemble, sometimes requiring more than one person to lift the cover for mounting over a cargo box. These covers are also large and bulky, even in a collapsed state, and accordingly are difficult to store in the truck or elsewhere.

A removable cover disclosed by Bowman, U.S. Pat. No. 4,709,956, is designed to be assembled by a single person and to collapse for transport. However, even in its collapsed state, this cover remains large and bulky and cannot be readily stored in the cab of the truck for convenient transport.

SUMMARY OF INVENTION

It is an object of the invention to provide a removable cover which can easily be assembled by one person.

It is another object of the invention to provide a removable cargo box cover which is readily collapsible to facilitate storage.

It is a further object of this invention to provide a removable cargo box cover the installation of which requires no alterations or permanent mountings to the cargo box or truck.

It is yet another object of the invention to provide a removable cargo box cover which is easily transported for quick assembly during outdoor activities requiring a shaded cargo box.

These and other objects are provided by a cargo box cover which generally comprises a flexible cover sheet or tarp and a cover support frame. The cover sheet attaches at its front end to the roof of the pickup truck cab and extends rearwardly over a support frame to a rear portion of the cargo box. The rear edge of the cover sheet can be secured by straps or similar fastening structure which attach to the rear portion of the truck. The rear fastening structure is preferably adjustable to bring the cover sheet into taunt condition.

The support frame is provided to elevate the cover sheet over the rear portion of the cargo box. To facilitate storage and transport, the cover support frame is lightweight and readily collapsible. The cover support includes components which can be folded out from a compact, stored position to form a rigid support structure.

The cover support is adapted to mount to the cargo box without alteration of the cargo box structure and yet provide sturdy vertical support for the cover sheet. Mounting feet connected to lower ends of the cover support can be shaped to securely engage various portions of a cargo box, thereby enabling the user to select the placement of the cover support and to vary the orientation of the cover over the cargo box area.

The present invention thus provides an elevated cargo box cover for shading and sheltering against various weather elements. The present invention can be used to convert an open cargo box into a shaded resting area for use during outdoor activities such as camping, picnicking or the like. Similarly, the shaded cargo box can be used as a viewing area for spectators of outdoor events including auto racing, football and the like.

DETAILED DESCRIPTION OF THE PREFERRED EMBODIMENT

Figure 1:
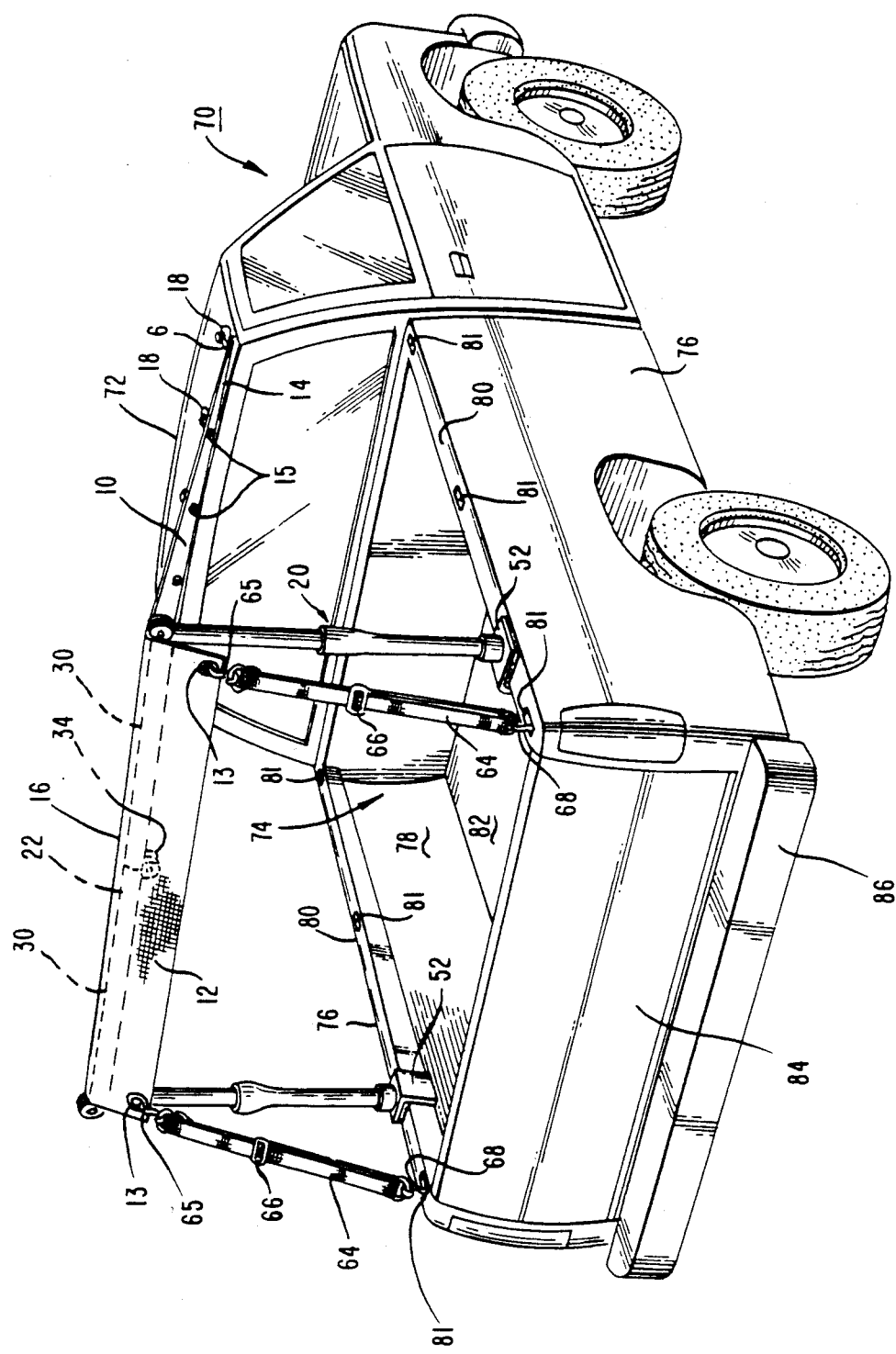
FIG. 1 is a perspective view of a preferred embodiment of the cargo box cover of the present invention.

Referring now to the drawings, and more particularly to FIG. 1, the cover assembly of the present invention is designed to cover the cargo box 74 of a pickup truck 70. The cargo box 74 includes sidewalls 76, tailgate 84, and floor 82. The cover assembly generally comprises a cover sheet 10 and a support frame 20 adapted to elevate the cover sheet above the cargo box 74. The cover sheet 10 is secured at its front and rear edges in a manner which requires no alteration of the truck 70. Moreover, the support frame 20 is preferably adapted to mount to the cargo box without modification to the cargo box structure.

Figure 2:
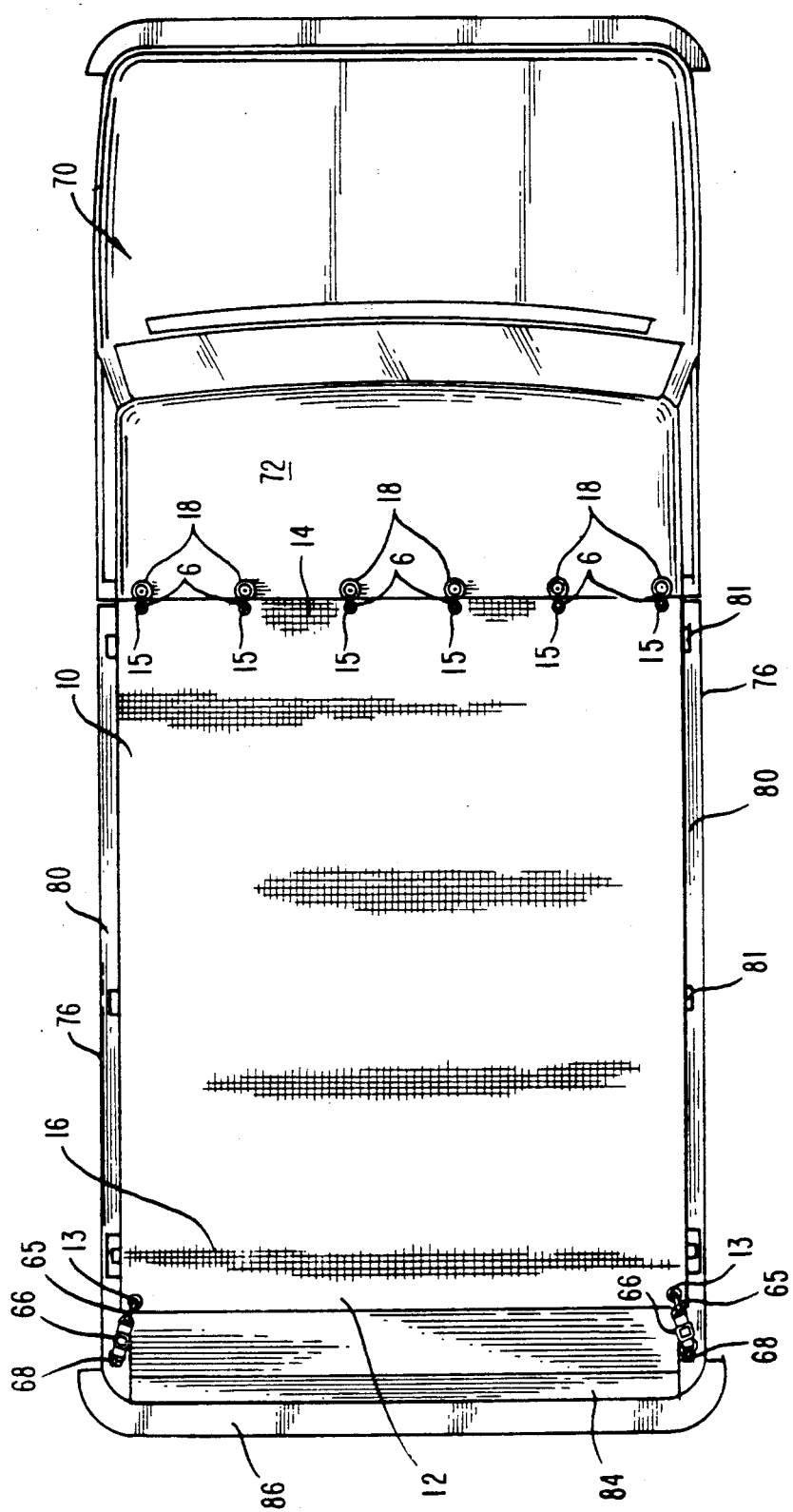
FIG. 2 is a top plan view of a preferred embodiment of the cargo box cover.

Referring to FIG. 2, in the preferred embodiment, cover sheet 10 attaches at its front portion 14 to the cab roof 72. Along a front portion 14 of the cover sheet 10, a series of holes 15 can be provided to receive hooks 6 for connecting the cover sheet 10 to a plurality of suction cups 18. Holes 15 can be reinforced by grommet rings. Suction cups 18 are applied to the truck cab roof 72 to secure the front portion 14 to the cab. Suction cups 18 are preferred in that these attachment means provide secure attachment and require no modification to the roof 72. The front portion 14 can alternatively be attached to the roof 72 by means of snaps or similar fastening means.

Preferably, the cover sheet 10 is made of a material which is water resistant for shelter from rain and will provide shade from sunlight. The cover sheet 10 can be made of fabric, such as cotton or canvas. Alternatively, the cover sheet 10 can be made of synthetic materials, such as nylon, vinyl, polyester, or other fiber fabrics. The width and length of cover sheet 10 should correspond generally to the width and length of the cargo box 74. The dimensions of cover sheet 10 can be varied to accommodate the cargo box dimensions of various pickup trucks available on the market.

Referring again to FIG. 1, cover sheet 10 extends rearwardly over the support frame 20 and can be securely connected to a rear portion of the truck 70. Although a variety of fastening means can be used to secure the rear portion 12 of sheet 10, straps 64 are preferred. Ties, suction cups, clasps, and other fasteners are also possible. In the preferred embodiment, straps 64 connect to rear portion 12 of cover sheet 10 by means of strap hooks 65 inserted into grommet-reinforced holes 13. The lower ends of straps 64 can have hooks 68 that are adapted to engage slots 81 in the top ledges 80 of sidewalls 76. Alternatively, strap hooks 68 can be attached to some other rear portion of truck 70, such as the bumper 86.

It is sometimes desirable to control the tension in cover sheet 10 to bring the sheet 10 into taunt condition. Therefore, straps 64 are preferably adjustable. The length of straps 64 is preferably made adjustable by buckles 66.

The support frame 2 should be lightweight and collapsible for easy assembly, storage, and transport. Moreover, support frame 20 should preferably be adapted to mount to various portions of cargo box 74 without alteration to the structure of the cargo box 74.

Figure 4:
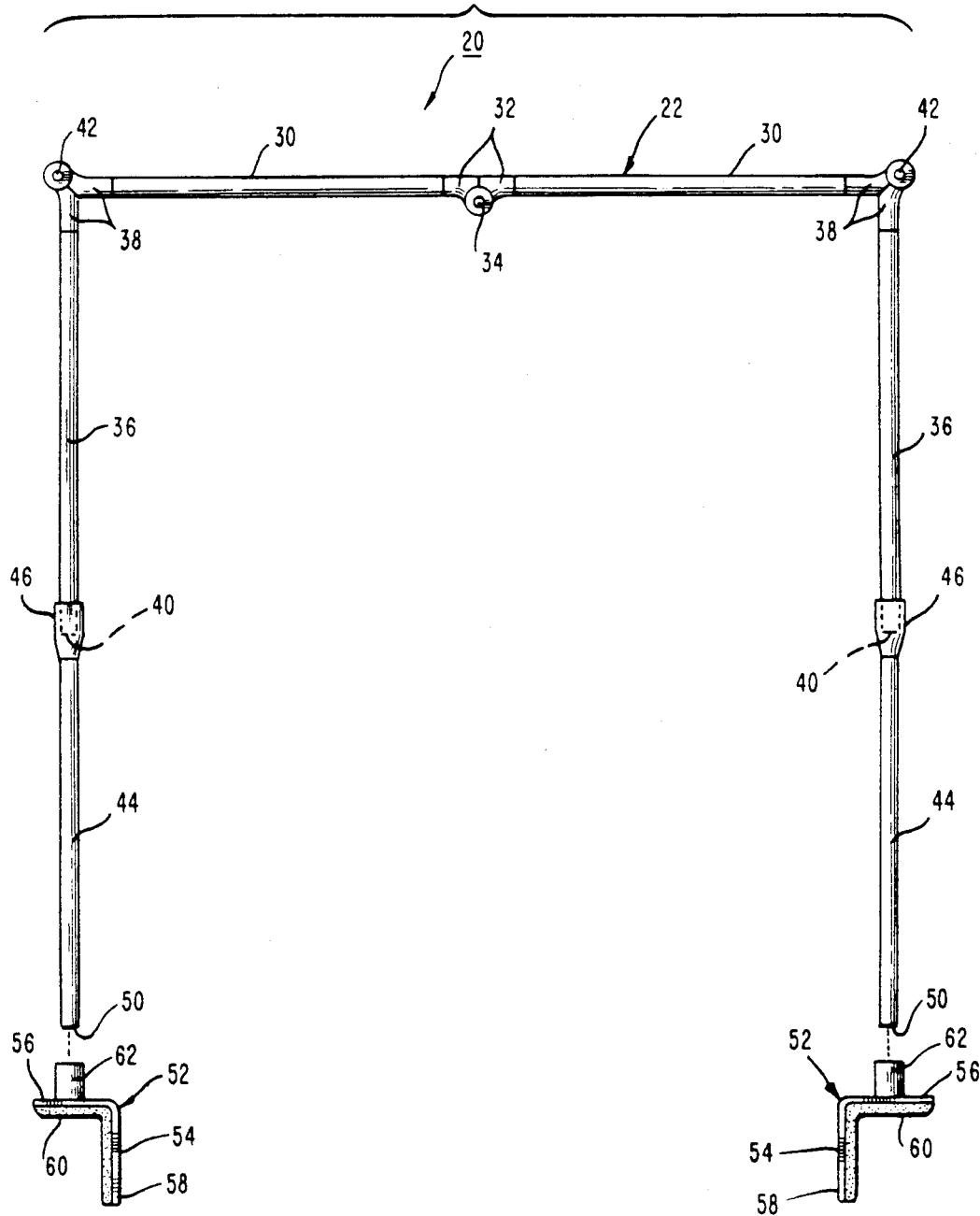
FIG. 4 is an exploded front elevation view of a cover support frame, extension posts, and post brackets of the present invention.

Support frame 20 can be made collapsible by providing components which are foldable or which telescope relative to one another. Referring to FIG. 4, a preferred embodiment of support frame 20 comprises a pair of top support members 30, pivotally connected by a central hinge 34, to form a collapsible top support portion 22. Each top support member 30 is preferably pivotally connected by an outside hinge 42 to a vertical support member 36. Top support member 30 and vertical support members 36 are preferably made of lightweight material, such as plastic or aluminum.

The support frame 20 should be adapted to mount to cargo box 74 without modification to the cargo box structure. In the preferred embodiment, mounting brackets 52 are adapted to engage sidewalls 76 of the cargo box 74. These mounting brackets 52 can be formed integrally to the lower ends of vertical support members 36 or extension posts 44. Preferably, the mounting brackets 52 are separable components for alternate attachment to either vertical support members 36 or extension posts 44.

The brackets 52 preferably have contact surfaces which are formed to match various contours of cargo box 74. For example, each bracket 52 can have a generally L-shaped mounting foot 54, comprising of horizontal portion 56 and a vertical portion 58. The L-shaped mounting structure is adapted to engage the top ledge 80 of the sidewall 76. The horizontal portion 56 contacts top ledge 80, and the vertical portion 58 engages an inner face 78 of sidewall 76. The brackets 52 engage, but are not connected to sidewalls 76, and thereby can be positioned almost anywhere along the length of sidewall 76 to adjust the maximum height of cover sheet 10 to various points along cargo box 74. Accordingly, the user can increase or decrease the elevated area of cover sheet 10, or the point of maximum elevation, as desired.

The mounting brackets 52 can alternatively be adapted to provide a flat or contoured mounting surface (not shown) for mounting on different portions of cargo box 74, such as inner protruding wheel wells or portions of the cargo box floor 82. Brackets 52 and mounting feet 54 can be adapted to secure support frame 20 at a substantially vertical position, although it is possible to form the brackets 52 and mounting feet 54 to secure support frame 20 in an inclined position rearwardly or forwardly relative to the cargo box 74. To prevent scratching or slipping, feet 54 can provide a cushion 60 on the contact surfaces.

The height of elevation provided by support frame 20 is preferably higher than the height of the cab roof 72. This elevation can be made sufficiently high to enable users to stand in cargo box 74, and below the cover sheet 10, to view outdoor events such as auto races. The vertical support members 36 can be made sufficiently long to provide this preferred elevation.

To reduce the length of the support frame 20 in its compact, storage configuration, extension posts 44 are preferably provided, and are adapted to connect to the vertical support members 36, and to further elevate support frame 20 above cargo box 74, thereby reducing the required length of the vertical support members 36. The extension posts 44 can be permanently attached to vertical support members 36 and adapted to pivot relative to vertical support members 36 or slide in telescope fashion relative to vertical support member 36 to reduce the length of the support frame 20 in its compact, storage configuration.

Extension posts 44 are most preferably adapted to removably engage vertical support members 36. By providing this removable feature, the present invention enables the user to vary the height of elevation provided by support frame 20, conditioned on the particular use of the cargo box. The structure for removably connecting the extension posts 44 to the vertical support members 36 can be constructed in any of several suitable constructions. Preferably, each extension post 44 provides at its upper end a bell socket 46 for receiving the lower end 40 of a vertical support member 36. The lower end 50 of each extension post 44 can be adapted to fit into a female fitting 62 in mounting bracket 52. By providing sockets 46 in the extension posts 44 and fittings 62 in the mounting brackets 52, the lower ends 40 of vertical support members 36 can be directly inserted into mounting brackets 52 if the extra height provided by extension posts 44 is not desired.

Figure 7:
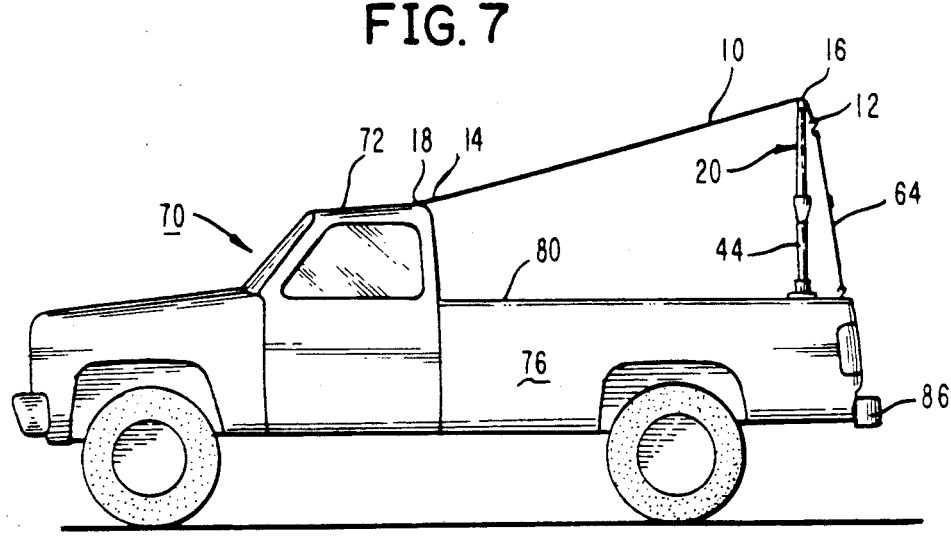
FIG. 7 is a side elevation view of the cargo box cover of the present invention as installed on a truck in a first mode of assembly.
Figure 8:
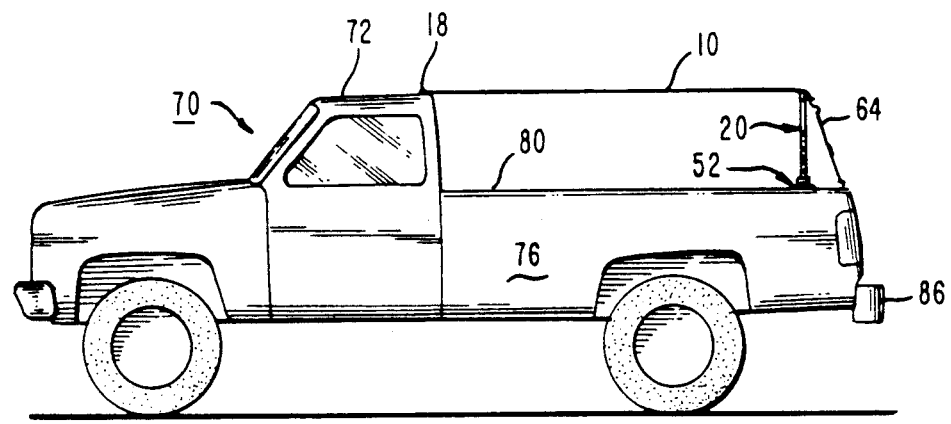
FIG. 8 is a side elevation view of the cargo box cover of the present invention as installed on a truck in a second mode of assembly.

Referring to FIGS. 7-8, the support frame 20 can be formed to elevate cover sheet 10 to a height substantially equal to the height of cab 72 when extension posts 44 are not used (FIG. 8). When extension posts 44 are connected to the support frame 20, cover sheet 10 can be elevated above the height of cab roof 72, thereby inclining the sheet 10 upwardly toward the rear of truck 70 (FIG. 7). The lower, horizontal configuration can be preferably selected when cargo box 74 is used as a resting area. The alternative, inclined configuration can be selected when the cargo box 74 is used as a sitting, standing, and viewing area during outdoor activities such as sporting events.

Figure 5:
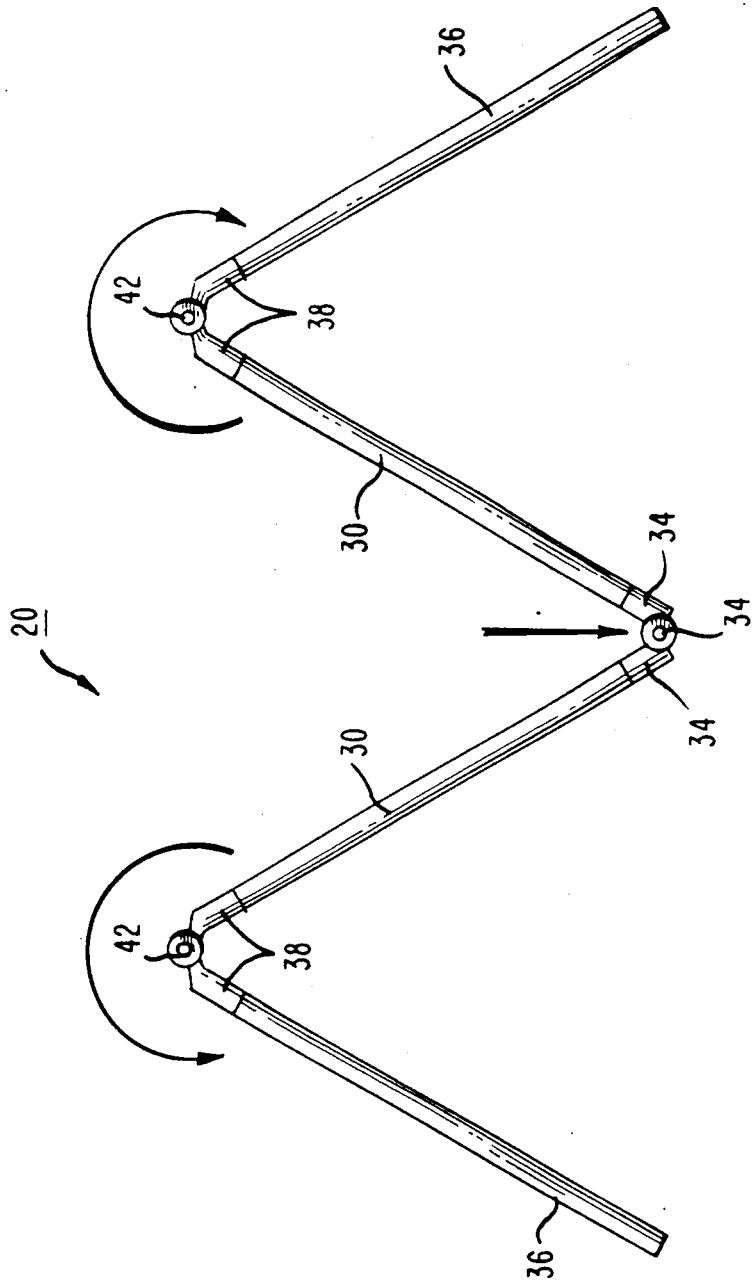
FIG. 5 is a front elevation view of the cover support frame of the present invention illustrating the pivotal collapse of the cover support.
Figure 6:
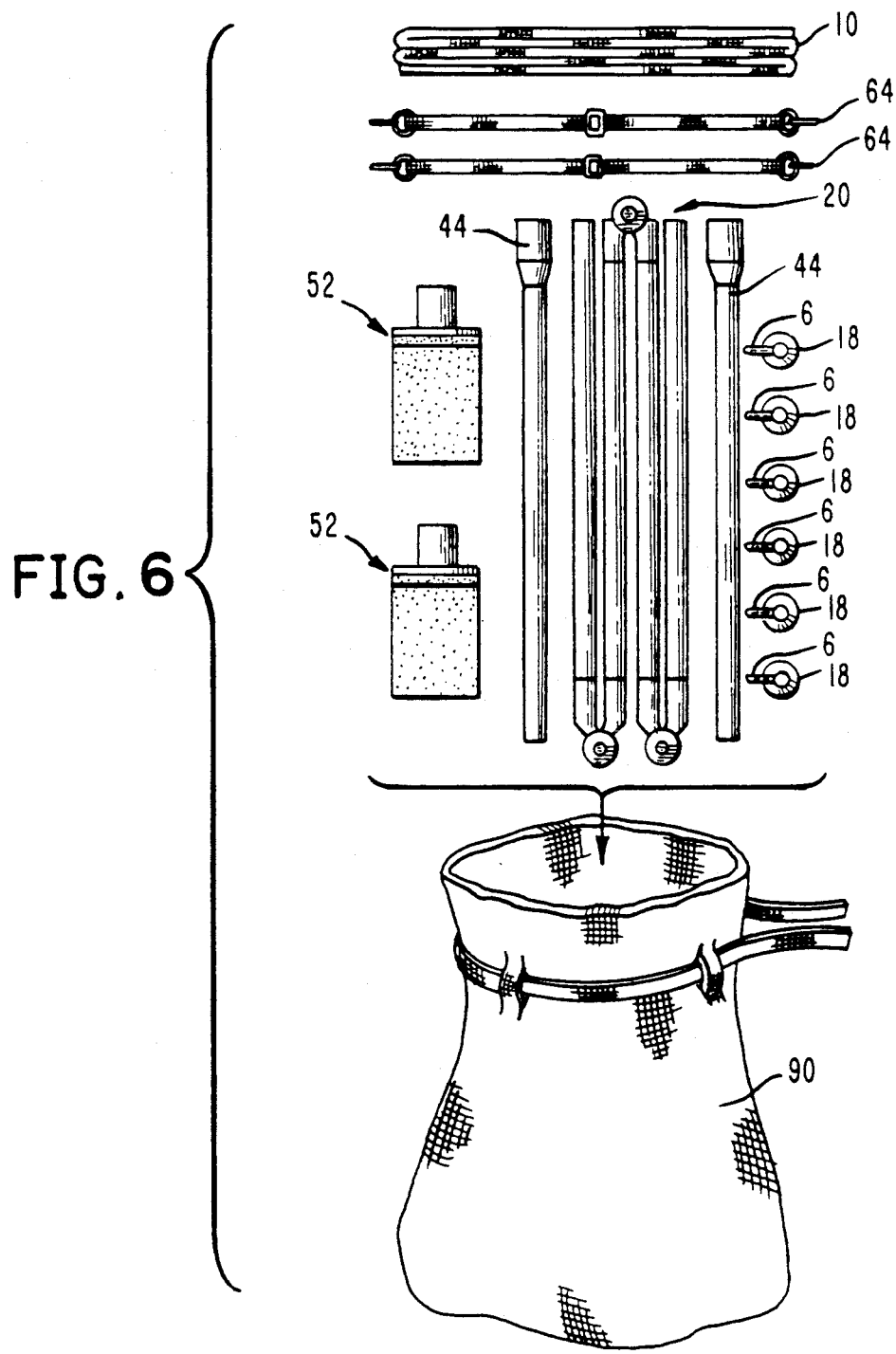
FIG. 6 is an illustration of the components of the cargo box cover of the present invention in the collapsed condition and with associated storage bag.

Referring to FIGS. 4-6, the support frame 20 of the preferred embodiment can be easily manipulated from a compact, stored configuration, as shown in FIG. 6, to an expanded, operational position, as shown in FIG. 4. The vertical support members 36 and the top support members 30 are rotated about the hinges 34 and 42, respectively, into rigid configuration. Top support members 30 are rotated about central hinge 34 until abutment ends 32 contact. These abutment ends 32 prevent further upward rotation of top support members 30. Similarly, vertical support members 36 are rotated about hinges 42 until abutment ends 38 engage, thereby rigidly positioning vertical support members 36 transversely to top support portion 22 and preventing further inward rotation of top support members 36.

During installation, one bracket 52 is mounted to a sidewall 76, and extension post 44 is inserted into the female fitting 62. The second bracket 52 is positioned directly across from the first bracket 52 on opposite sidewall 76. By applying inwardly directed force to the second extension post 44, the lower end 50 is aligned and inserted into the fitting 62 of second bracket 52.

To insure secure lateral support to the support frame 20, the width of top support portion 22 can be constructed to be slightly wider than the width of cargo box 74. Due to this greater width, vertical support members 36 and extension posts 44 must be pulled inwardly to mount in the fittings 62 of the brackets 52. The resilient reaction of vertical support member 36 and extension posts 44 to this inward urging creates outwardly directed forces from the vertical portions 58 of bracket feet 54 to the inner faces 78 of sidewalls 76. The resulting frictional forces prevent lateral and rotational displacement of the support frame 20 and extension posts 44 relative to the sidewalls 76.

Figure 3:
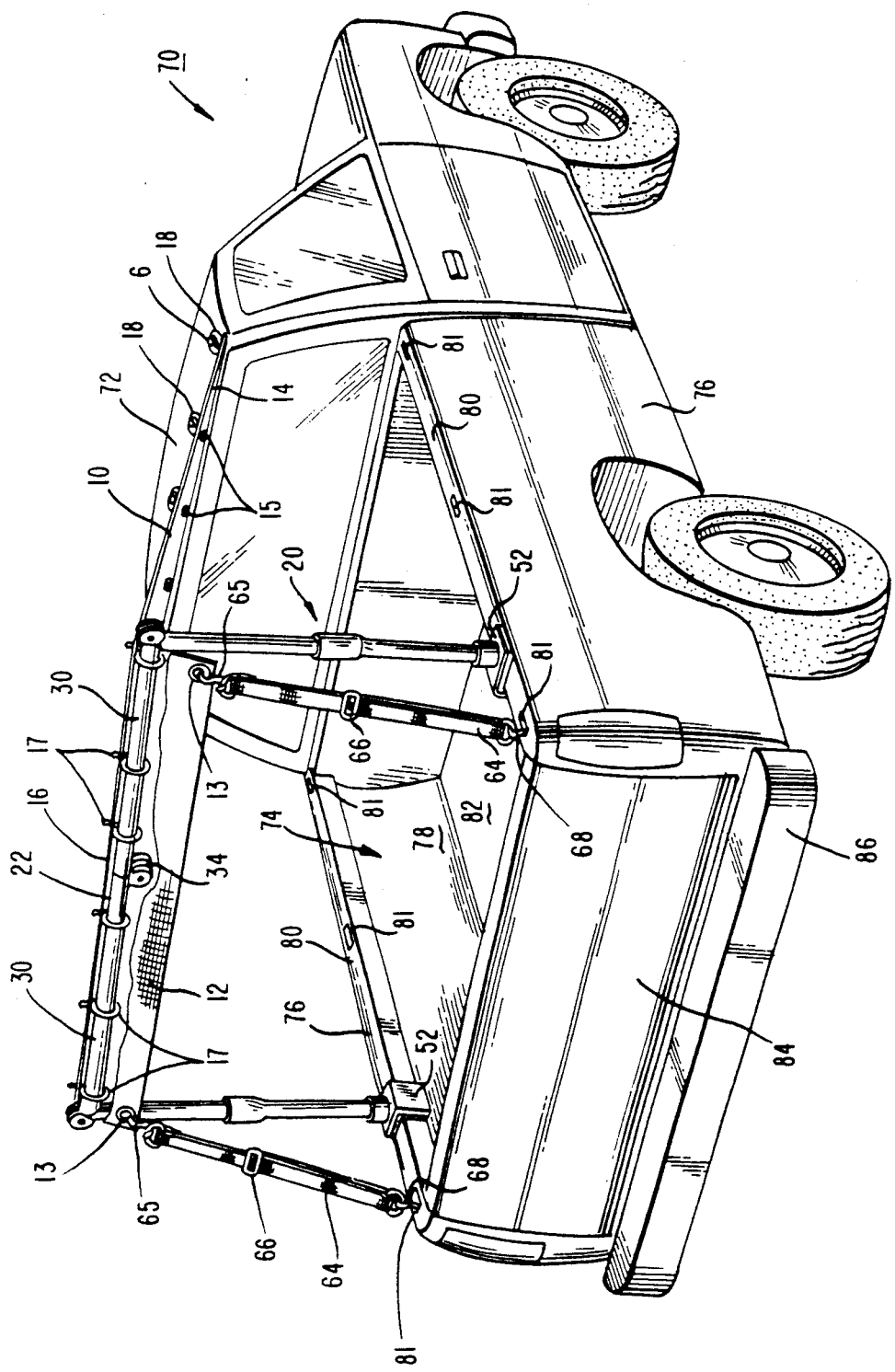
FIG. 3 is a perspective view of an alternative cargo box cover, partially broken away.

Referring to FIG. 3, to further secure the support frame 20 in a substantially vertical position, cover sheet 10 can provide restraining structure, such as support hooks 17, at a medial portion 16 to engage top support portion 22. The support frame 20 is prevented from rotating rearwardly about brackets 52 by the overhang of rear portion 12. Any tendency of support frame 20 to rotate forwardly is prevented by the restraining structure. The restraining structure can alternatively be a velcro strip (not shown) applied to the medial portion 16 of cover sheet 10 for engagement with a corresponding velcro strip (not shown) on top support portion 22.

During disassembly for storage and transport, the adjustable straps 64 can be manipulated to loosen the tension in cover sheet 10. Support frame 20 can be preferably disassembled and folded so that the vertical support members 36 and top support members 30 are in compact parallel alignment. Referring to FIG. 6, the folded support frame 20 as well as extension posts 44 and post brackets 52 are placed in storage bag 90. The storage bag 90 containing the components of the cover assembly can then be stored in a convenient place, such as behind the seat in the cab of truck 70 or elsewhere.

Although the description of this invention has been given with reference to particular embodiments, this description should not be construed as limiting the scope of this invention. Many variations and modifications may now occur to those skilled in the art. Accordingly, it is intended that the scope of the invention be limited only by a reasonable interpretation of the appended claims.

I claim:

1. A removable cover assembly for a cargo box of a truck comprising:

flexible cover means;

a cover support for elevating a portion of the cover means above the cargo box, said cover support including at least one collapsible frame for removably engaging the cargo box, said frame including top support members pivotally connected to one another at inner end thereof, and having outer ends, and a pair of vertical support members pivotally connected to said outer ends, whereby each of said top support members and vertical support members can be pivoted to positions of substantially parallel and adjacent alignment relative to each other to collapse said cover support to a size convenient for transport and storage;

front fastening means for attaching a front portion of the cover means to a front portion of the truck; and rear fastening means for connecting a rear portion of the cover means to a rear portion of the truck.

2. The removable cover assembly according to claim 1, wherein the cover support comprises separable frame members, whereby said separable members can be connected for supporting said cover means over said cargo box area, and separated for compact storage.

3. The removable cover assembly according to claim 1, wherein the frame further comprises mounting feet for engaging the cargo box, said mounting feet being shaped to engage a corresponding portion of the cargo box.

4. The removable cover assembly according to claim 3, wherein the mounting feet are shaped to engage a top portion of sidewalls of the cargo box.

5. The removable cover assembly according to claim 4, wherein the mounting feet are generally L-shaped.

6. The removable cover assembly according to claim 3, wherein the mounting feet are separable from the frame.

7. The removable cover assembly according to claim 1, further comprising extension posts detachably engaging said vertical support members and thereby raising a height of said cover support and said cover means over said cover box.

8. The removable cover assembly according to claim 1, wherein the front fastening means include suction cups.

9. The removable cover assembly according to claim 1, wherein the front fastening means connects to the front portion of the truck without alteration of the truck and the rear fastening means connects to the rear portion of the truck without alteration of the truck.

10. The removable cover assembly according to claim 9, wherein the rear fastening means includes adjustable straps.

11. The removable cover assembly according to claim 1, wherein the front fastening means and the rear fastening means secure the cover means in a substantially taut condition.

12. A removable cover assembly for a cargo box of a truck comprising:

flexible cover means;

a cover support for elevating a portion of the cover means above the cargo box, said cover support including at least one collapsible frame for removably engaging the cargo box, said cover frame extending in a substantially vertically plane;

restriction means connected to said cover means for engaging the frame and preventing the frame from rotating out of said substantially vertical plane;

front fastening means for attaching a front portion of the cover means to a front portion of the truck; and rear fastening means for connecting a rear portion of the cover means to a rear portion of the truck.

13. The removable cover assembly according to claim 12, wherein the restriction means comprises a plurality of hooks which partially surround a top portion of the frame.

* * * * *